(12) United States Patent
Scarpelli et al.

(10) Patent No.: US 6,816,898 B1
(45) Date of Patent: Nov. 9, 2004

(54) INTERFACING EXTERNAL METRICS INTO A PERFORMANCE MANAGEMENT SYSTEM

(75) Inventors: Joe Scarpelli, Mountain View, CA (US); Sridhar Sodem, Santa Clara, CA (US); Atul Garg, Saratoga, CA (US); Alex LeFaive, Sunnyvale, CA (US); Rajesh Badhe, San Jose, CA (US)

(73) Assignee: ProactiveNet, Inc., Alviso, CA (US)

( * ) Notice: Subject to any disclaimer, the term of this patent is extended or adjusted under 35 U.S.C. 154(b) by 578 days.

(21) Appl. No.: 09/640,967

(22) Filed: Aug. 16, 2000

(51) Int. Cl.[7] .................................................. G06F 15/173
(52) U.S. Cl. ........................ 709/224; 709/223; 714/47
(58) Field of Search .............................. 709/223, 224; 714/47

(56) References Cited

U.S. PATENT DOCUMENTS

| | | | | |
|---|---|---|---|---|
| 5,506,955 A | * | 4/1996 | Chen et al. ................... 714/26 |
| 5,748,881 A | * | 5/1998 | Lewis et al. ................... 714/47 |
| 5,796,633 A | * | 8/1998 | Burgess et al. ............. 702/187 |
| 5,819,028 A | * | 10/1998 | Manghirmalani et al. ...... 714/57 |
| 5,949,976 A | * | 9/1999 | Chappelle ................... 709/224 |
| 6,052,694 A | * | 4/2000 | Bromberg ................... 707/200 |
| 6,327,677 B1 | * | 12/2001 | Garg et al. ................... 714/37 |
| 6,405,327 B1 | * | 6/2002 | Sipple et al. ................. 714/39 |
| 2002/0013748 A1 | * | 1/2002 | Edmison et al. .............. 705/35 |

* cited by examiner

*Primary Examiner*—Nabil El-Hady
(74) *Attorney, Agent, or Firm*—Blakely, Sokoloff, Taylor & Zafman LLP (57) ABSTRACT

A method and apparatus for network management is described. In one embodiment, a method comprises collecting performance data having accompanying meta data including information defining the performance management data and information indicating operations to be performed on the performance management data, and generating output data for display using collected performance management data according to the information indicating the operations to be performed on the performance management data.

12 Claims, 12 Drawing Sheets

```
#!/bin/sh
# ################################################################### #
# Copyright : @ 1999 ProactiveNet Inc.
# File : remedy.sh
# Description : Returns information on the Remedy ARS Service Monitor
# Author : Steven Snyder
# Date : $Date: 1999/06/24
# ################################################################### #
# This script takes the following parameters:
# USERNAME: Remedy user login
# PASSWORD: The users password
# SERVER: The ip address of the Remedy ARS server

# This example executes a binary, passing the username, password, server to connect to, and the commands
# to execute. The binary logins into the server, executes the commands and echoes the data to standard out
# where it's read by the ProactiveNet system.
# Initialization etc. ################################################ #
unalias -a RESPONSESCRIPT=/usr/ar/api/src/driver/driver1.in
CONFIGSCRIPT=/usr/ar/api/src/driver/driver2.in
DRIVER=/usr/ar/api/src/driver/driver
CAT=/bin/cat
ECHO-echo # shell built-in
RM=/bin/rm PATH=/bin:/usr/bin:/usr/sbin:/etc
export PATH progname=`basename $0` if [ $# -lt 5 ]
then
$ECHO "usage $progname -[config|stat] <ip> <timeout> <username>
<password>" >&2
exit 1
fi

SERVER=$2
USERNAME=$4
PASSWORD=$5 if [ "$1" = " -stat"]
then
$DRIVER $USERNAME $PASSWORD $SERVER $RESPONSESCRIPT
fi

# ----------------------------------------
if [ "$1" = " -config"]
then
$DRIVER $USERNAME $PASSWORD $SERVER $RESPONSESCRIPT
fi
exit 0
```

INTERFACING EXTERNAL METRICS INTO A PERFORMANCE MANAGEMENT SYSTEM

FIELD OF THE INVENTION

The present invention pertains to the field of network management. More particularly, this invention pertains to the field of interfacing with network management.

BACKGROUND OF THE INVENTION

Networks are used to interconnect multiple devices, such as computing devices, and allow the communication of information between the various interconnected devices. Many organizations rely on networks to communicate information between different individuals, departments, work groups, and geographic locations. In many organizations, a network is an important resource that must operate efficiently. For example, networks are used to communicate electronic mail (e-mail), share information between individuals, and provide access to shared resources, such as printers, servers, and databases. A network failure or inefficient operation may significantly affect the ability of certain individuals or groups to perform their required functions.

A typical network contains multiple interconnected devices, including computers, servers, printers, and various other network communication devices such as routers, bridges, switches, and hubs. The multiple devices in a network are interconnected with multiple communication links that allow the various network devices to communicate with one another. If a particular network device or network communication link fails, multiple devices, or the entire network, may be affected.

Network management is the process of managing the various network devices and network communication links to provide the necessary network services to the users of the network. Typical network management systems collect information regarding the operation and performance of the network and analyze the collected information to detect problems in the network. For example, a high network utilization or a high network response time may indicate that the network (or a particular device or link in the network) is approaching an overloaded condition. In an overloaded condition, network devices may be unable to communicate at a reasonable speed, thereby reducing the usefulness of the network. In this situation, it is important to identify the network problem and the source of the problem such that the proper network operation can be restored.

The operations performed by the network management system are often controlled via software on one or more computer systems. Typically, in the prior art, a determination is first made to determine what the application is and then software is created to control how to administer it, how to control it, how to configure it, and how to display it. The result is software that is very specific to the types of data that is being collected, stored, analyzed and displayed. Because of this, there is new code written for each application and stored for use in the system. As developing such software is time consuming and expensive, it would be advantageous to reduce the amount of software development in network management systems.

Furthermore, typical computer network management systems collecting data from components within a network, these network management systems usually collect typical infrastructure information only, such as server response time, and network parameters such as packets transmitted, packets lost, etc. They do not collect specific business-oriented data useful in commercial applications. In fact, management or business-oriented data is usually neglected by current network management system. For example, a typical network management system does not keep track of the number of tickets sold in an airline's web site, even though the statistics on the number of tickets sold would be very useful to an airline using the network management system. In this situation, the company usually has its own network management staff to generate a script-based program to collect this particular piece of information, in addition to the data already collected by the system installed. Although the script-based program is relatively simple to generate, additional effort is required to integrate the customized data collected (e.g., the number of tickets sold in the airline's web site) with the typical data collected by the network management system. Even more effort and time is required to analyze these different types of data in order to maintain the network and to troubleshoot.

SUMMARY OF THE INVENTION

In one embodiment, a method comprises collecting performance data having accompanying meta data including information defining the performance management data and information indicating operations to be performed on the performance management data, and generating output data for display using collected performance management data according to the information indicating the operations to be performed on the performance management data.

BRIEF DESCRIPTION OF THE DRAWINGS

The invention is illustrated by way of example and not limitation in the figures of the accompanying drawings, in which like references indicate similar elements, and in which.

DETAILED DESCRIPTION

A method and apparatus for performance monitoring and management in a networked environment is described. In the following description, numerous details are set forth to provide a thorough understanding of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

In the present invention, generic modules, as well as the data storage, receive data and are able to process the data using information that accompanies the data. Thus, the data is fed into module, regardless of its type, from the environment that created it. A meta data definition accompanies the data and indicates what it is that is being collected and what is to be done with the data being collected. For example, the meta data may indicate that an alarm is to be associated with the data or may indicate how to administer. Thus, in order to enable or add a new application to monitor a new element, the module that obtains the data and returns a value and define what is to be done with the data. Then, the others modules, such as the stage module, the analysis module and the presentation module understand what is defined in the data to take the corresponding operations or actions, based on the meta data that indicates what operations or actions to perform on or with the data.

For example, the user interface may change by what is in the meta data. Thus, while one application may show 4 variables, the receipt of new data with different meta data may result in the display of 19 variables. The same can be said about hiding variables. Thus, the only inputs that are needed to collect data and the meta data indicating the operations to be performed on the collected data. In other words, the system takes in arbitrary data and user interface is able to display it.

The modules that receive and process the data are part of a performance management system. In one embodiment, the performance management system comprises an e-business performance management system. The performance management system may monitor the network as well as applications. In one embodiment, the performance management system provides real time monitoring of Internet transaction performance to address the reliability and responsiveness of on-line businesses to their customers and partners. The system characterizes overall end-to-end e-transaction response time and response times down to the sub-transaction level, so that quick isolation of hot spots and bottlenecks can be detected. The system also identifies response times at the e-commerce sub-transaction level, the Web app server level, and the underlying database levels, as well as for performance variables at the device level for the network, load balancers, firewalls and servers.

In one embodiment, scripts or other applications may be incorporated into the system. For example, scripts matter to perform performance monitoring or management may be used and incorporated into the system. An API enables easy integration of custom scripts that have been written to gather specific information and useful business metrics, including site traffic, orders received, abandoned orders and sales.

In one embodiment, a graphical user interface is used to enable to define the name of the application, the script of application, along with a set of attributes (e.g., input, output, etc.). The user's program must generate the output.

A meta application programming interface (API) provides a user interface for the performance management system, network performance monitoring and management. It allows the user to rapidly and directly integrate one or more script-based programs into network performance monitoring and management. The data types defined in the script-based programs will be incorporated into the data of network performance monitoring and management. Thus, it saves the user time and effort in integrating and analyzing the data with meta data.

Figure 1:
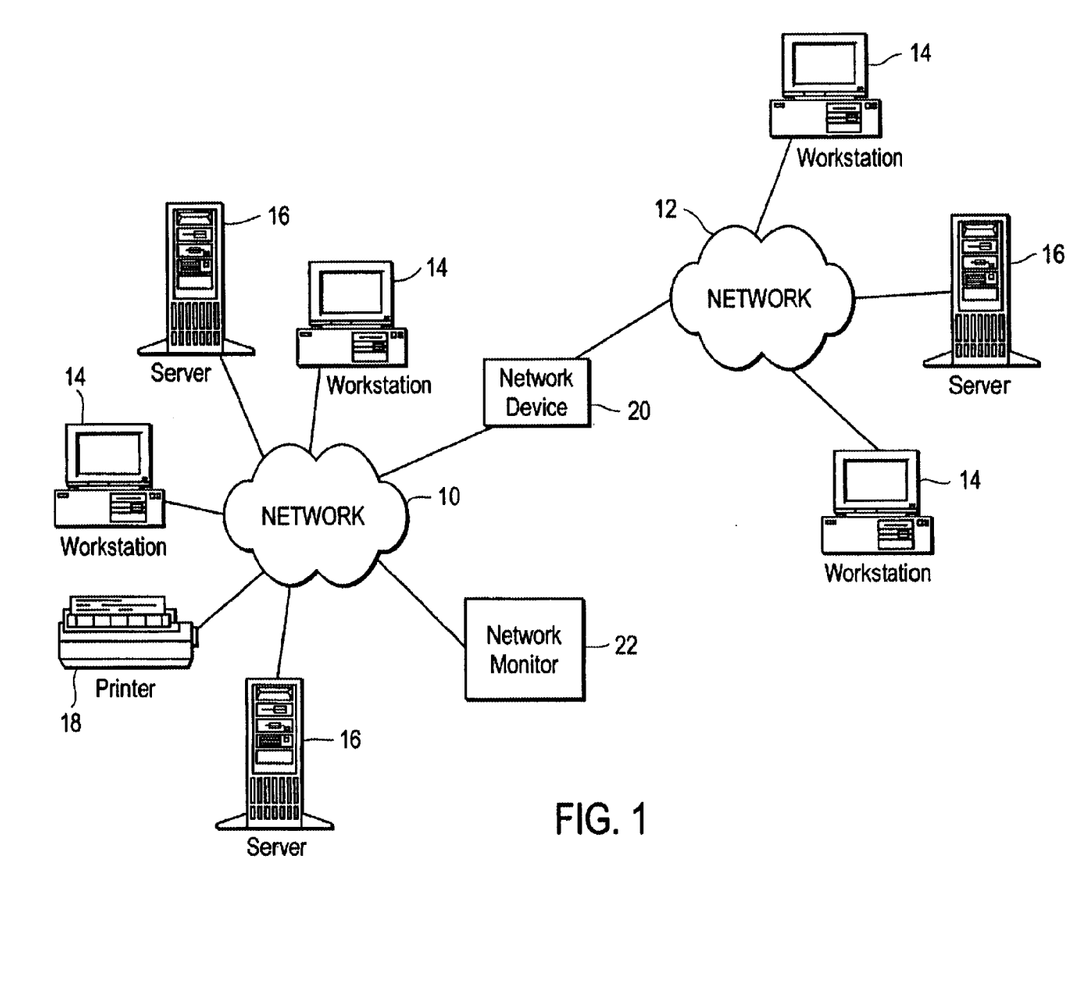
FIG. 1 illustrates an embodiment of a network environment.

FIG. 1 illustrates an embodiment of a network environment in which the present invention can be implemented. The network environment of FIG. 1 contains multiple network devices coupled to one another using a pair of networks 10 and 12. In particular, a pair of workstations 14 and a pair of servers 16 are coupled to network 10. Additionally, a printer 18 and a network monitor 22 are coupled to network 10. A network device 20 (such as a router, bridge, switch or gateway) is coupled to both network 10 and network 12. Network device 20 allows network data to be exchanged between network 10 and network 12, thereby allowing network devices coupled to network 10 to communicate with other network devices coupled to network 12. Another pair of workstations 14 and a server 16 are also coupled to network 12. Although FIG. 1 shows four workstations and three servers, a particular network environment may contain any number of workstations, servers, printers, or other network devices interconnected with one another in any configuration. Networks 10 and 12 may use any communication protocol and may utilize any network topology. Additionally, network 10 and network 12 may use different protocols and different network topologies. If different protocols or different topologies are used, then network device 20 is required to translate or otherwise convert data between the two different protocols or two different topologies.

Network monitor 22 is coupled to network 10, but is capable of monitoring network devices, interfaces, and communication links associated with network 10 as well as network 12. Network monitor 22 is also able to monitor the operation and performance of various sub-systems, components, or applications contained within a network device. For example, network monitor 22 can monitor the CPU performance, memory utilization, and application response time of workstations and servers contained in the network environment. Although a single network monitor 22 is shown in FIG. 1, in an alternate embodiment of the invention, a separate network monitor is coupled to network 12. In this embodiment, network monitor 22 monitors network devices, interfaces, and communication links associated with network 10, while the network monitor coupled to network 12 monitors network devices, interfaces, and communication links associated with network 12. In other embodiments of the invention, a single network monitor 22 is capable of monitoring network devices, interfaces, and communication links associated with three or more different networks.

FIG. 1 illustrates an exemplary network environment. Those of ordinary skill in the art will appreciate that the teachings of the present invention can be used with any number of network environments and network configurations. Furthermore, the teachings of the present invention can be used to monitor any network device, system, component, or application for which information can be gathered, either directly or indirectly. Additionally, the present invention is capable of monitoring any communication link or interface within a network or between a network and a network device. Although FIG. 1 illustrates network monitor 22 as a separate network device, network monitor 22 may be incorporated into another network device, such as server 16.

Figure 2:
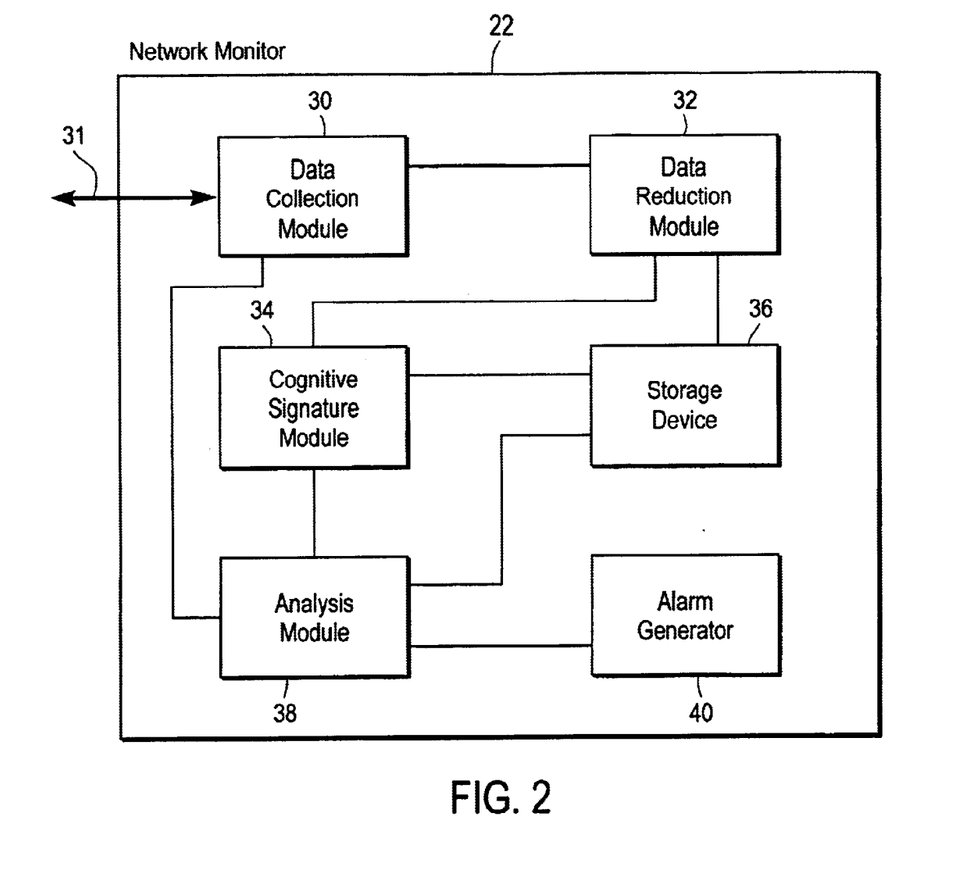
FIG. 2 illustrates and embodiment of a network monitor capable of detecting problems or potential problems in a network environment.

FIG. 2 illustrates an embodiment of a network monitor 22 capable of detecting problems or potential problems in a network environment. Network monitor 22 includes a data collection module 30 that collects information from various devices or applications, such as information regarding network utilization (or device utilization), lost packets, response time, or number of errors. Data collection module 30 collects information regarding the operation or performance of the network environment on one or more communication links 31. Data collection module 30 can collect data from any number of networks and any number of network devices or applications. Data collection module 30 is coupled to a data reduction module 32, which reduces the collected data by reducing the granularity of the data over time and performing statistical reduction of the data, as discussed below.

Data reduction module 32 is coupled to a cognitive signature module 34 and a storage device 36. Cognitive signature module 34 generates and maintains multiple dynamic cognitive signatures based on the data collected from the network. A cognitive signature represents the normal operating mode for a particular network device, network interface, system, application, or communication link with which the cognitive signature is associated. The cognitive signature is based on actual historical data collected regarding the operation and performance of the network environment. The cognitive signature is dynamic, such that it is continually updated to include the most recent data collected by the data collection module.

In a particular embodiment of the invention, a separate cognitive signature is provided for each day of the week. A cognitive signature for a particular day of the week may include data separated into multiple time periods (e.g., each hour of the day). For example, a cognitive signature for Tuesday may include a particular time period that represents the normal operating mode (based on collected historical data) for a particular network device from 9:00 a.m. to 10:00 a.m. on Tuesday. A cognitive signature for Saturday may include a time period that represents the normal operating mode for a particular network interface from 2:00 p.m. to 3:00 p.m. on Saturday. Additional details regarding cognitive signatures are discussed below.

In the embodiment of FIG. 2, cognitive signature module 34 receives data from data reduction module 32. In this embodiment, the granularity of the collected data has already been reduced when received by cognitive signature module 34. In an alternate embodiment of the invention, cognitive signature module 34 may receive data directly from data collection module 30. In this alternate embodiment, cognitive signature module 34 receives the actual data collected, rather than a reduced set of data. Thus, the cognitive signatures can be generated using the actual data without any loss of detail due to averaging or other data reduction procedures.

Storage device 36 may be any type of mechanism capable of storing data, such as a random access memory (RAM), disk drive, or tape drive. Storage device 36 is capable of receiving data from data reduction module 32, cognitive signature module 34, and an analysis module 38. Analysis module 38 receives collected data from data collection module 30, and receives one or more cognitive signatures from cognitive signature module 34. Analysis module 38 analyzes current performance or operation of the network environment by comparing the data collected via the network with the cognitive signatures, which represent past performance or operation of the network environment at similar times for similar devices, systems, or applications.

Analysis module 38 may also compare the current data collected with one or more threshold values. Analysis module 38 is coupled to an alarm generator 40. Based on the results of the analysis performed by analysis module 38, an alarm signal may be communicated to alarm generator 40. In response to the alarm signal, alarm generator 40 may generate an e-mail message to a network administrator or other personnel, initiate a page to a network administrator's pager, or communicate the alarm information to another system or application. Additionally, alarm generator 40 may initiate a pre-programmed procedure that is executed in response to a particular type of alarm.

Figure 3:
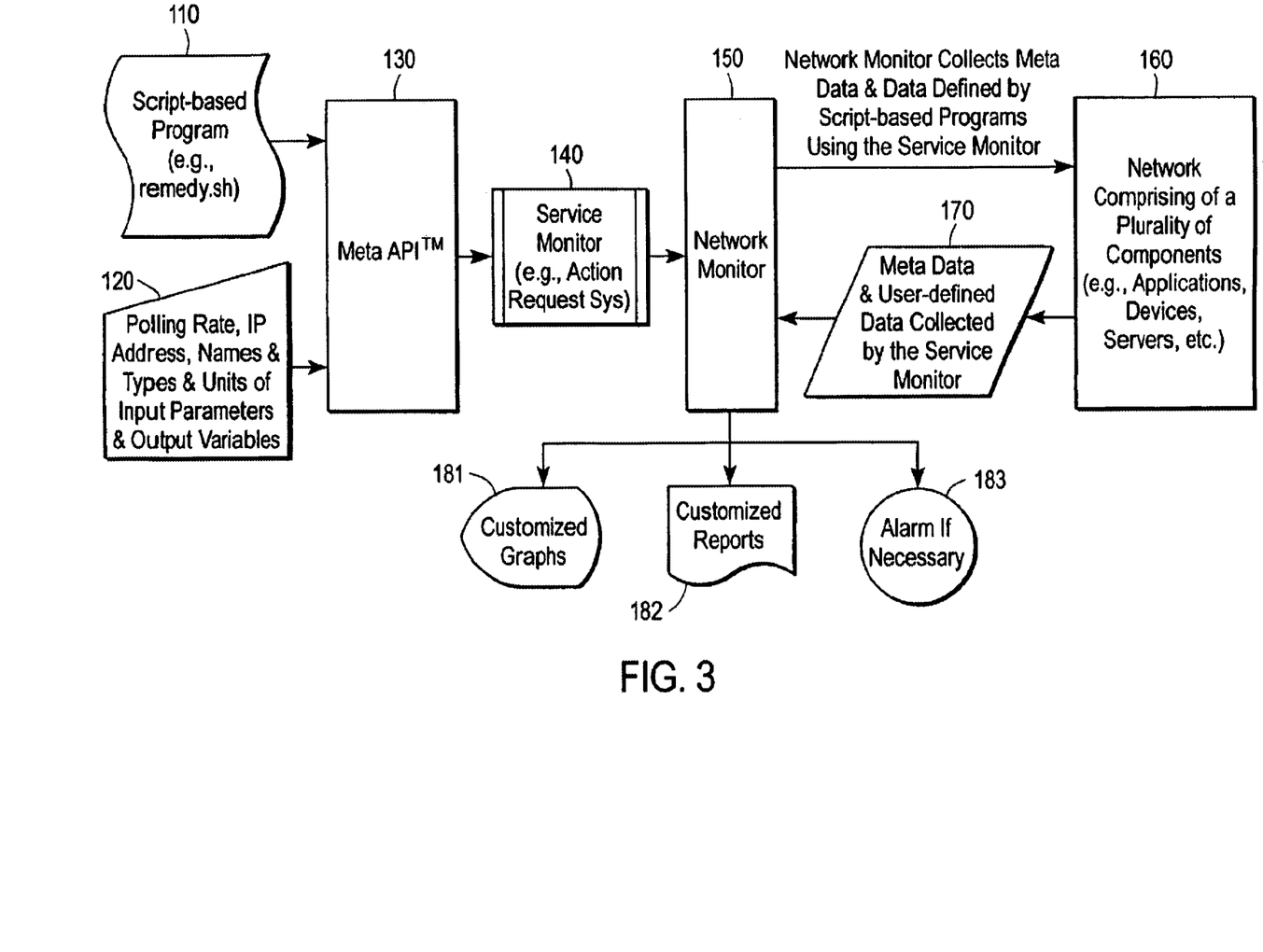
FIG. 3 illustrates a data flow diagram of monitoring system for monitoring a network of components.

FIG. 3 is a data flow diagram of the claimed invention. Referring to FIG. 3, a user provides at least one script-based program to the meta API 130. In one embodiment, the user provides the script-based program by copying the script into a directory server on a sever used by the network managing system (e.g., network monitor 150). In one embodiment, the script can be in any shell script language, PERL, or any similar program language. Alternatively, an executable of the script-based program could be used.

The user may also provide information 120 to the meta API. Information 120 may comprise poling rate, IP address, names and types, and units of input and output variables. In other words, information 120 comprise user defined customized data types. Such data types are used by the script-based program.

Network monitor 150 collects meta data and data defined by the script-based programs from the network 160 using service monitor 140. The returned data 170 is then processed by network monitor 150. The processing by network monitor 150 may include generated customized graphs 181, customized records 182, and/or setting an alarm 183 if necessary.

In one embodiment, the performance management system invokes the script in the following format:

```
Script -[config|stat]<ip_address><timeout_seconds><input_
    param1> . . .
<input_paramN>
```

The first argument for the script is either "-config" or "-stat." The second argument is the IP address of the target device or application. The third argument is the timeout value for the script to return output values. Any number of the input parameters may follow these arguments. The output is in the following format (with each variable on a separate line):

```
output_var1=value output_var2=value

. . .

output_varX—value
```

In one embodiment, the sequence and names of the input parameters are the same as defined in the registration process explained below, and output variable values are returned on the standard output device (stdout).

In one embodiment, there are two types of polls in the performance management system. Depending upon the type of poll, a first argument passed to the script program is either "-config" or "-stat". A config poll gathers configuration information such as the version of the application running. By default, the configuration poll is scheduled once a day. Configuration data is not shown in graphs, but is reportable. A config poll accepts any type of data. Stat poll gathers information for which the user wants to graph, report and receive alerts. By default, the Stat poll is scheduled at 5 minutes interval. Stat poll only accepts integer and floating point data within the range of 0.001 and U.S. Pat. No. 4,294,967.

The poll rates for both Config and Stat polls may be modified via an Admin graphical user interface (GUI) by editing the service monitor's instance Control tab.

If the output value is "NO_DATA" (for numeric value), the performance management system does not plot a data point in the graph, no alarm will be triggered. If the output value is "NO_RESPONSE" (for numeric value), the network management t system sends/triggers an alarm.

After defining the program/script, the program/script is integrated into the network performance monitoring and management system.

If used with the remote agents, transfer the script and its dependencies on to the remote machine where the remote agent is installed.

In one embodiment, the program/script (and any dependencies) is placed in the following designated directory on the network performance monitoring and management server and its remote agent, creating the directory if necessary, such as, for example,

```
/usr/pw/pronto/usr_apps/bin.
```

In one embodiment, to integrate the script files into the network performance monitoring and management system:

1. Log into the network performance monitoring and management system as "root"
2. Copy the program/script and any dependencies into the /usr/pw/pronto/usr_apps/bin directory, creating the directory if necessary
3. Log out of the system After integrating the program/script into the network performance monitoring and management system, the program/script is registered as a new service monitor.

The network performance monitoring and management meta API provides a meta registration process through an administrator GUI. This registration process allows the administrator to define the name, inputs and outputs of the new service monitor, as well as the default values and other important parameters. The new service monitor can then be activated to monitor any applicable devices, applications or servers in the network.

In one embodiment, the following information is specified by the administrator registering the new Service Monitor:
1. Name of the new service monitor;
2. Filename of the program/script placed in /usr/pw/pronto/usr_apps/bin or other predefined direction;
3. Specifying if a remote agent is required to monitor a target device. If the script must run on the target machine, then a remote agent on the target machine is required. By specifying that the target machine requires a remote agent, the network performance monitoring and management system can check that this agent exists before it allows the service monitor to be activated; and 4. Input/Output Variables are defined in the following table.

Exemplary Application Monitor Plug-in Fields Definitions

| Input/Output | Hidden | Name | Type | Unit | Default |
|---|---|---|---|---|---|
| Input Parameters | If selected, the parameter name will be hidden from graphs. Used for passwords. | Up to 20 characters. Sequence and names must be the same as defined in the script. No blank input or illegal characters allowed: / & " * > < ! \ | String, Integer, Floating point | N/A | The default value will be displayed on the Admin GUI. The maximum is 50 characters. |
| Output Configuration Variables | N/A | Up to 20 characters. Sequence and names must be the same as defined in the script. No illegal characters allowed: / & " * > < ! \ | String, Integer, Floating point | String that defines the unit of the parameter. Displayed in graphs and reports. | N/A |
| Output Statistic Variables | N/A | Up to 20 characters. Sequence and names must be the same as defined in the script. No illegal characters allowed: / & " * > < ! \ | Integer, Floating point | String that defines the unit of the parameter. Displayed in graphs and reports. | N/A |

In one embodiment, the administrator restarts the network performance monitoring and management system if a service monitor definition is deleted or edited.

After registering the program/script as the service monitor, the new service monitor is activated. Once a new service monitor is registered into the network performance monitoring and management system, it can be activated via the network performance monitoring and management admin GUI.

The network performance monitoring and management system schedules the script for periodic execution and the data collected is stored in its database. The poll rate, alarm thresholds and other admin features may also be configured via the Admin GUI.

In one embodiment, everything that is managed by the network performance monitoring and management system is defined as a Managed Object (MO). These may be devices, applications or servers. The administrator may add new MOs within the customer's network environment into the network performance monitoring and management system and create new instances of the new service monitor onto the applicable MOs. The administrator can create graphs, set alarm thresholds, and perform any other standard MO operations with this new service monitor.

Figure 4:
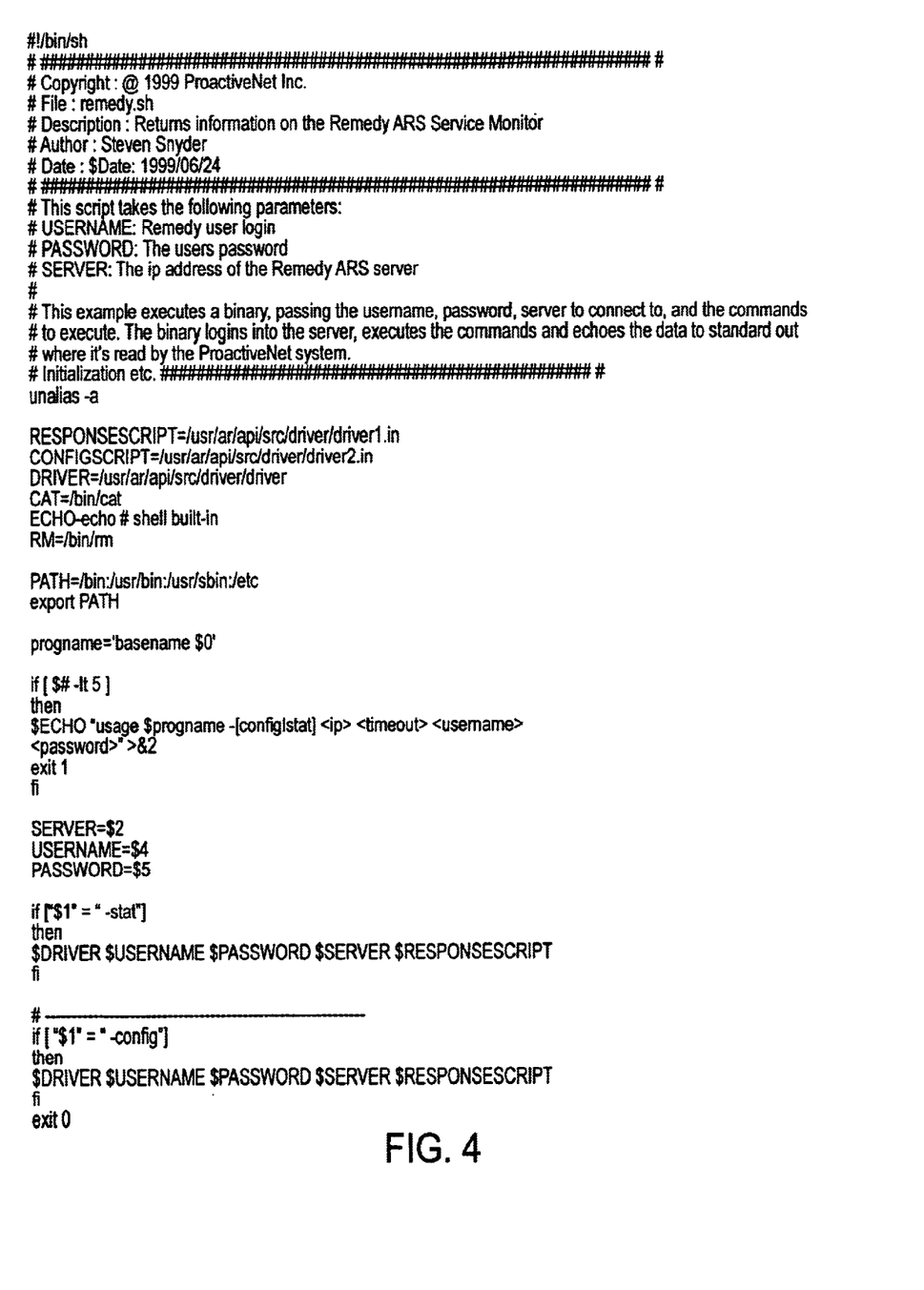
FIG. 4 is an example of a script-based program, provided to the claimed invention.

FIG. 4 shows an example of a script-based program, "remedy.sh", provided by the user. This is a typical simple shell script for collecting management or business oriented network data not covered by the performance management system. Such script-based programs are either existing programs used before installation of the performance management system or newly written executables to collect additional data not covered by the existing performance management system. The script in FIG. 4 is solely for llustration, not to restrict the type of scripts that can be accepted nor the type of data that can be defined within the scripts. In one embodiment, the user copies the file containing the script to a directory in the performance management system server. For example, "remedy.sh" is copied into a designated directory in network router 150. If remote agents are used in network performance monitoring and management, "remedy.sh" is copied into "/usr/pw/pronto/usr_apps/bin" as well.

Figure 5:
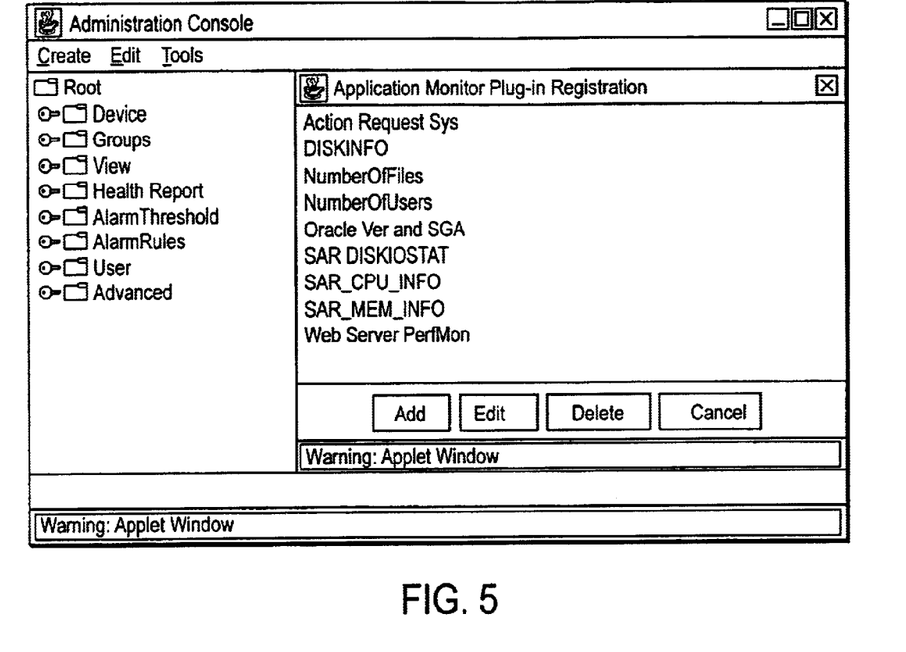
FIG. 5 shows an exemplary embodiment of an administration console window displayed to allow the user to register the script-based program as a service monitor in a network monitor.
Figure 6A:
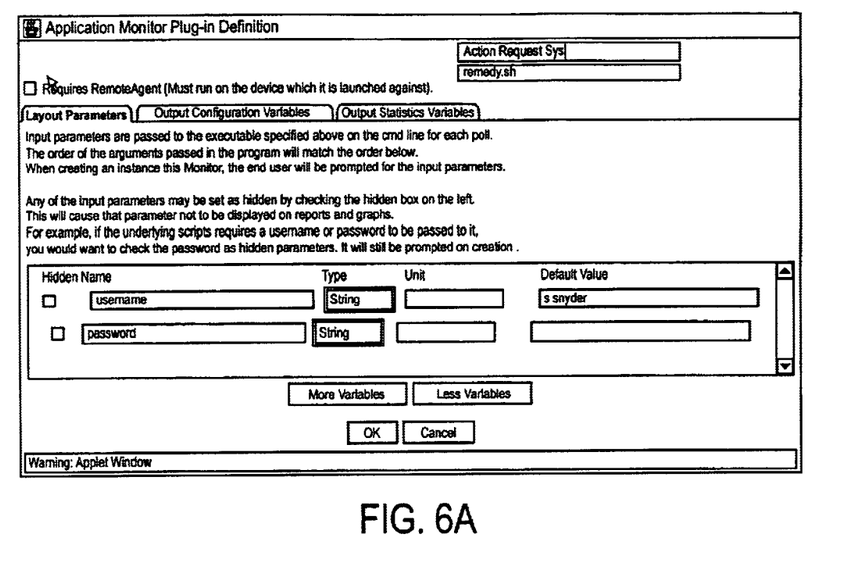
FIG. 6A shows an exemplary embodiment of the application monitor plug-in definition window, with an "Input Parameters" page displayed.
Figure 6B:
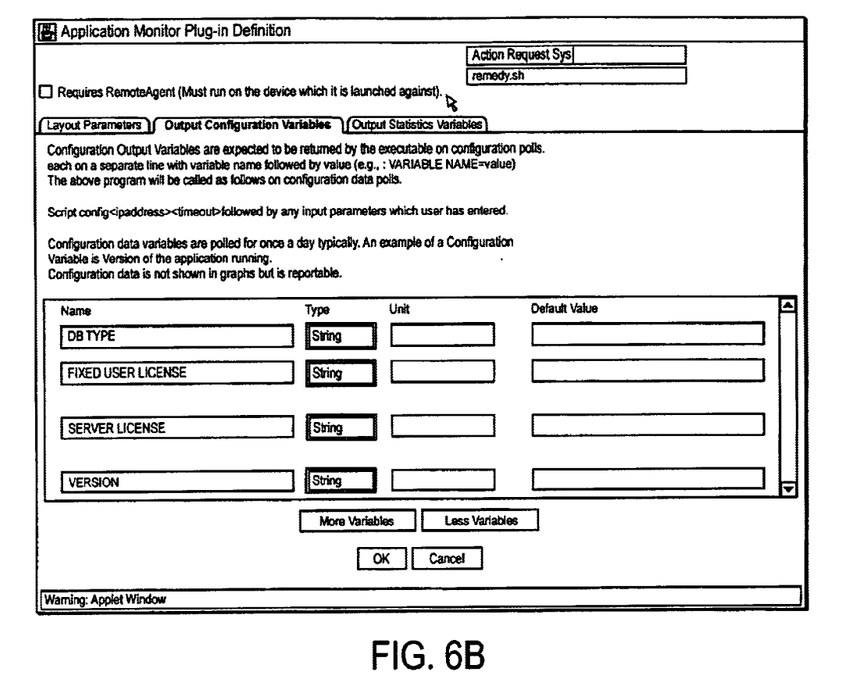
FIG. 6B shows an exemplary embodiment of the application monitor plug-in definition window, with an "Output Configuration Variables" page displayed.
Figure 6C:
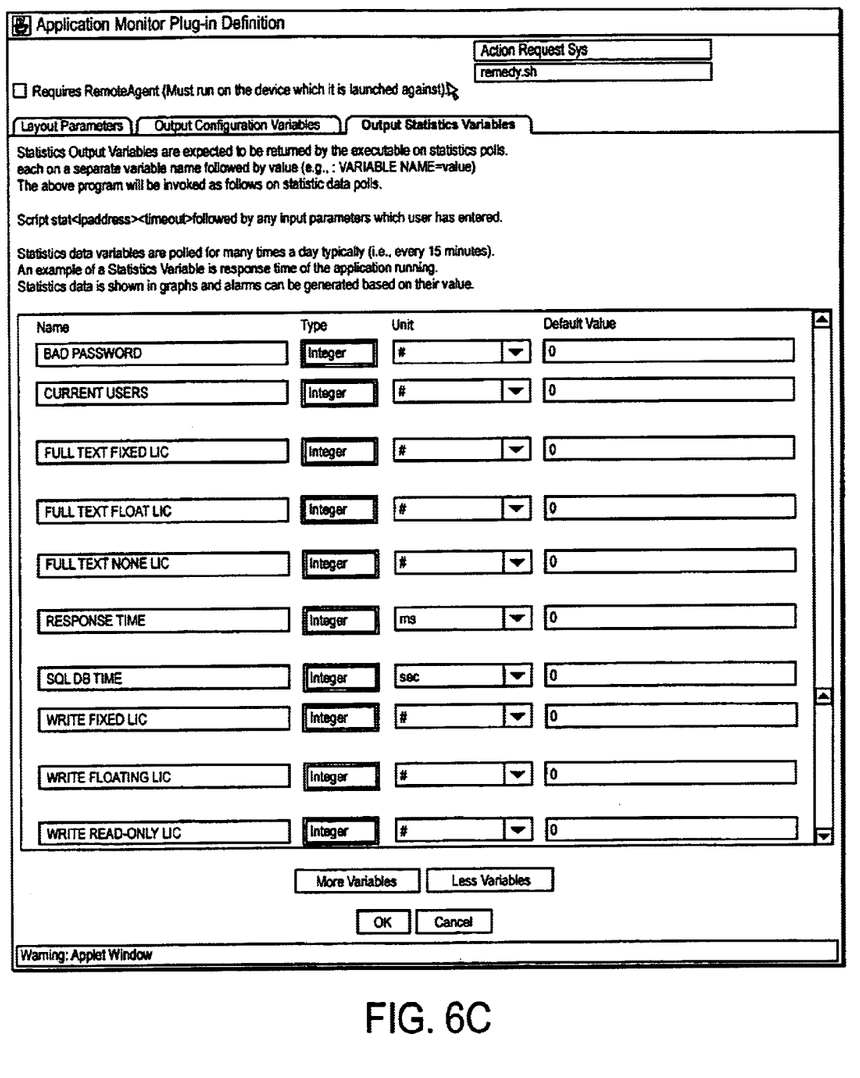
FIG. 6C shows an exemplary embodiment of the application monitor plug-in definition window, with an "Output Statistics Variables" page displayed.

FIG. 5 shows an exemplary administration console window displayed by the network and application performance monitoring and management system to allow the user to register the script-based program as a service monitor. Using the administration console window, the user indicates that he desires to add a service monitor by clicking the "Add" button in the window. In response to the selection, the system displays a window, referred to herein as the application monitor plug-in definition window, for the user to define the new service monitor. FIGS. 6A, 6B and 6C show various views of the window. The user inputs the name of the new service monitor ("Action Request Sys" in the example), the file name of the program corresponding to the monitor ("remedy.sh" in the example). Then the user enters the names, types and units of input parameters and output variables of the program into the corresponding fields in the window. The system provides the information from the user to the system such that the system can automatically call the service monitor and run it periodically. In one embodiment, network router 150 calls the service monitor by issuing commands on Solaris™ 2.6 platform, e.g. "script -config<IP address><timeout><input parameter 1><input parameter 2> . . . ", where the IP address, timeout value, names, types and units of input parameters are provided to network monitor 150 by the user via the administration console window and application monitor plug-in definition window.

Figure 7:
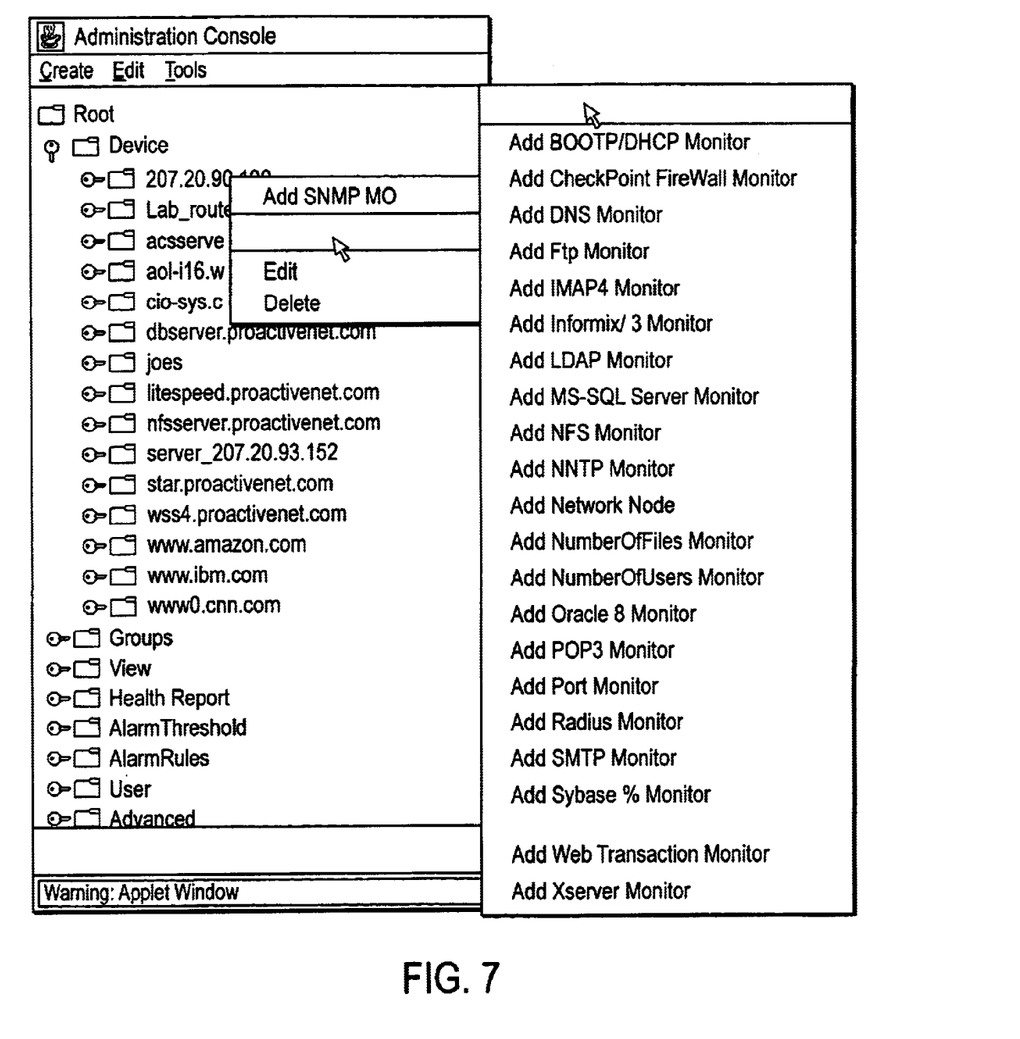
FIG. 7 shows an exemplary embodiment of an administration console window with a new service monitor added.
Figure 8:
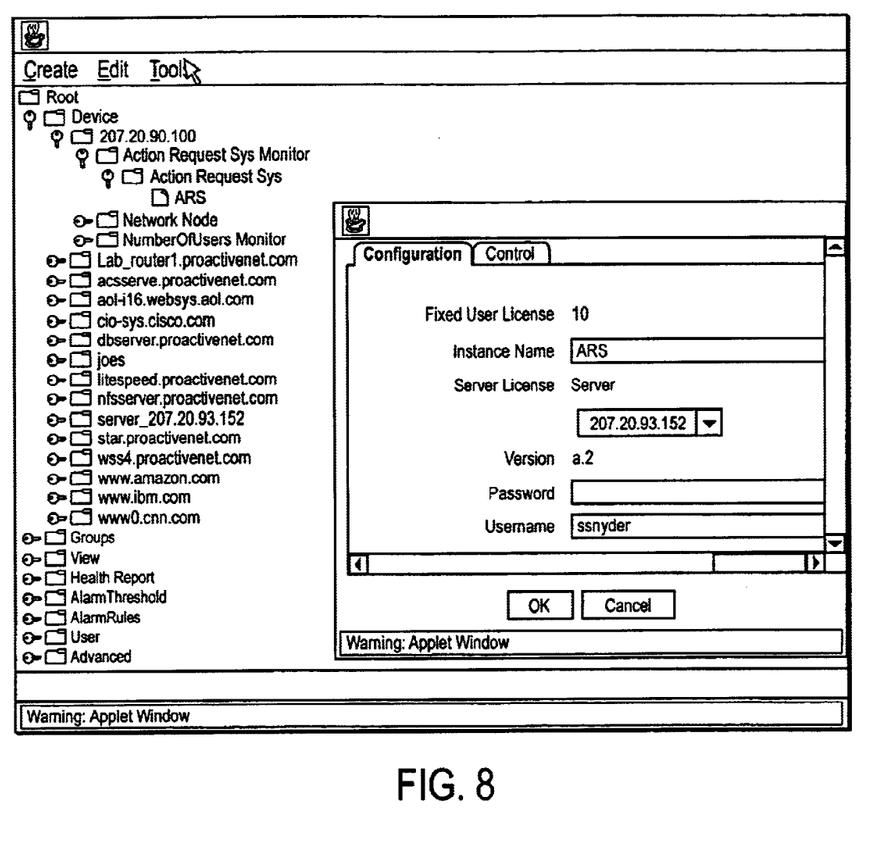
FIG. 8 shows an exemplary embodiment of an administration console window to activate a service monitor.

After the user has entered the required information, the register application program integrates the service monitor into the performance management system by adding the service monitor into a list of monitors available in the system. The user can activate the newly added monitor by selecting it via the performance management system's administration interface. FIG. 7 shows an example of the performance management system's administration interface with the new service monitor, referred to herein as action request sys monitor, being added. The user can activate the monitor by clicking on add action request sys monitor. FIG. 8 illustrates such a screen shot. Once the monitor is activated, the network performs monitoring and management system runs it periodically to collect the type of data defined in the service monitor. Network monitor also analyzes the data with meta data, which has already been defined within performance monitoring and management system.

Once the user indicates that he wants to add a new service monitor, additional windows will be displayed to allow the user to enter additional control information, such as polling rate, timeout limit, user name and password. FIG. 6 shows an example of such a window displayed by the preferred embodiment.

As soon as the new service monitor is added and activated, the network performance management system automatically uses it to collect the customized data from the components of the network, and apply all its core functions to the customized data. The meta API provides a way to incorporate user-defined data types into meta data, the data structure that comes with network performance monitoring and management. Once the user-defined data type is incorporated with meta data, network performance monitoring and management can apply all its core functions to it, e.g., graphing, baselining, reporting, alarming, data collecting and system administrating. For example, network performance monitoring and management can generate a graph displaying data of both the user-defined data types and meta data.

Figure 9:
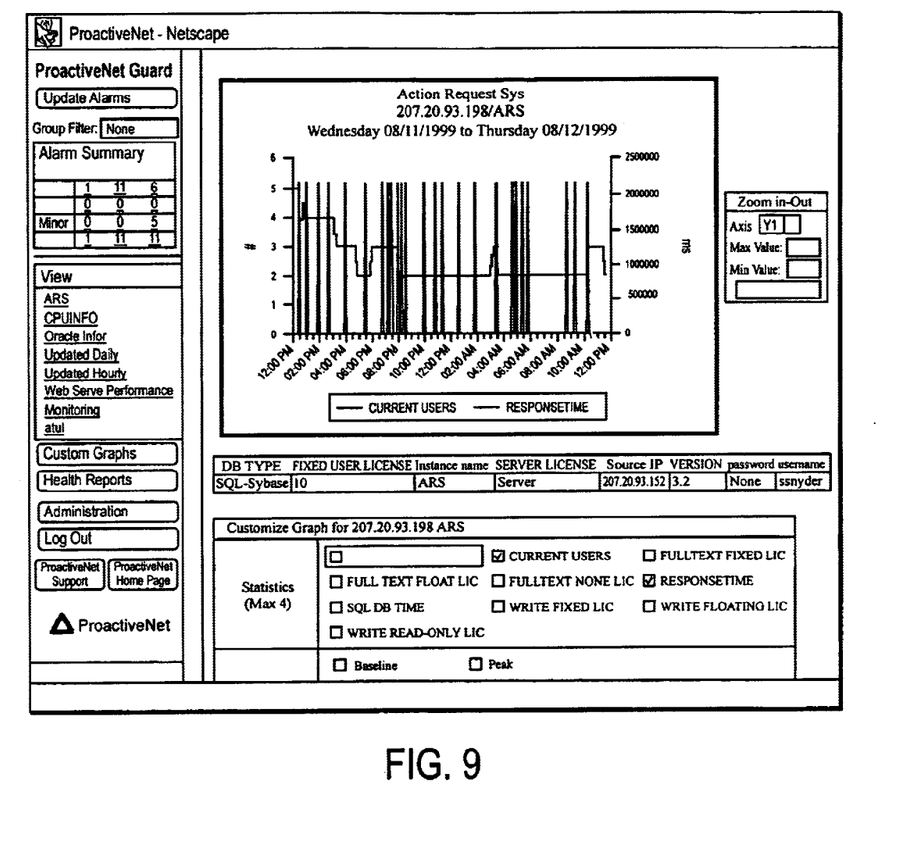
FIG. 9 shows a graph generated by a network monitor of the data collected using an action request system monitor.

FIG. 9 shows an example of a graph generated by network performance monitoring and management of the data collected using the action request sys monitor. The graph shows the number of users and the server response time within a one-day period. In addition, network performance monitoring and management allows the user to customize the graph such that the user-specified data can be graphed by itself or with other types of data incorporated in meta data.

By pulling the customized data types into network performance monitoring and management using the claimed invention, the user does not have to spend extra time and effort to analyze the customized data the script-based programs collected. Network performance monitoring and management automatically analyzes the data for the user. The network monitor integrates the script-based programs into network performance monitoring and management, which automatically collects and applies all functions of network performance monitoring and management to the business-oriented data specified by the user. Thus, the user can have network performance monitoring and management to handle his business-oriented data in the same way as the network infrastructure data, meta data. This facilitates rapid troubleshooting and problem correction in the network. The quicker a company resolves its network problems, the greater the customer satisfaction will be. Thus, the network monitor saves users time and effort in achieving customer satisfaction.

One advantage of the network performance monitoring and management system is to make it easier to integrate individual script-based programs with the performance management system. It allows incorporation of virtually any types of data into the performance monitoring and management system. Furthermore, the user can rapidly obtain results of analysis of the customized data collected in the format chosen by the user. Typical functions provided by the performance management system, such as collection of data, analysis of data, returning of the results are automatically applied to the user-defined data types in the script-based program once the script-based program has been integrated into the performance management system.

An interface between a user and a performance management system has also been described. In particular, this interface provides easy and rapid integration of individual script-based programs with a performance management system. It also provides the user with rapid analysis and presentation of the data. Furthermore, through the analysis of the data, particular problems in the network may be identified and one or more warnings may be generated.

Figure 10:
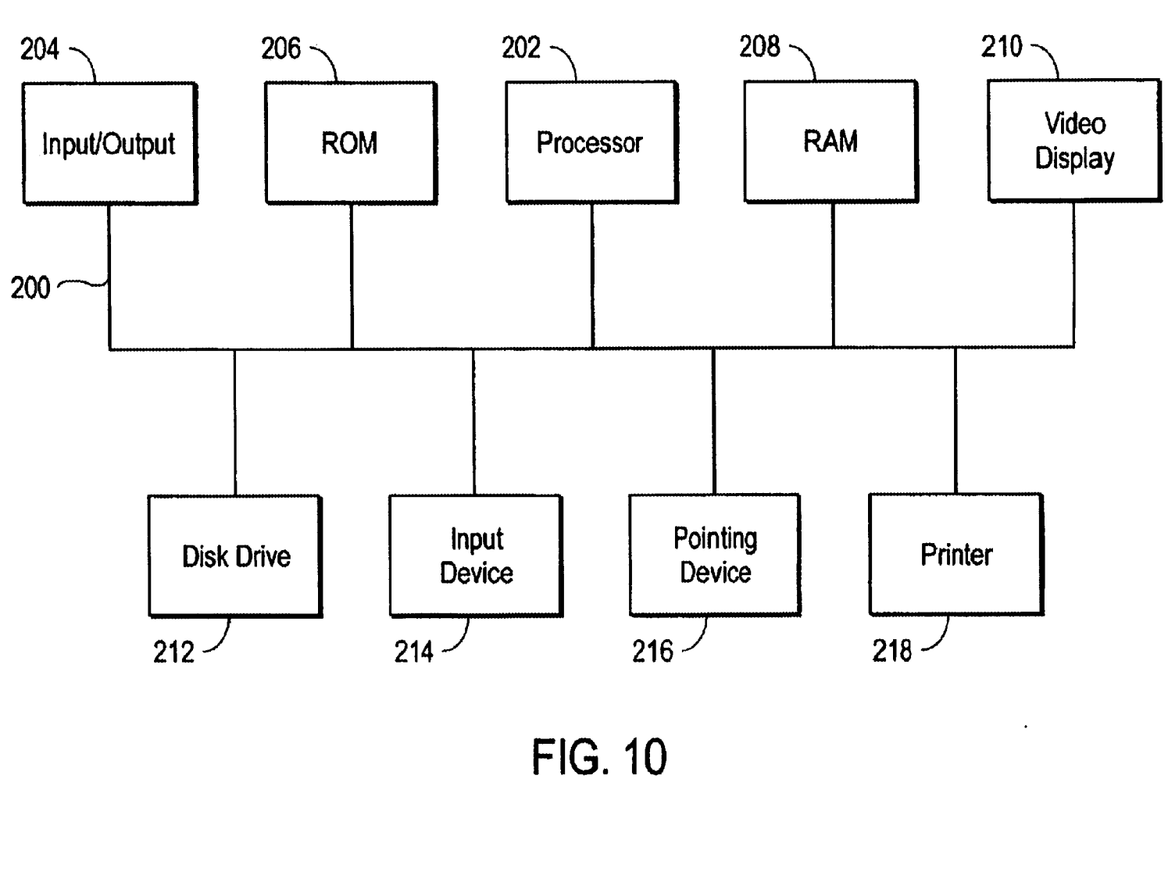
FIG. 10 illustrates an embodiment of a computer system that can be used with the present invention.

FIG. 10 illustrates an embodiment of a computer system that can be used with the present invention. For example, embodiments of the invention may use a computer of the type shown in FIG. 10 for a network monitor, a network device, a server, or any other device contained in or used with the monitoring system discussed above. The various components in FIG. 10 are provided by way of example. Certain components of the computer in FIG. 10 can be deleted for particular implementations of the invention. The computer system shown in FIG. 10 may be any type of computer, including a general purpose computer.

FIG. 10 illustrates a system bus 200 to which various components and devices are coupled. A processor 202 performs the processing tasks required by the computer. Processor 202 may be any type of processing device capable of implementing the steps necessary to perform the various procedures and operations discussed above. An Input/Output (I/O) device 204 provides a mechanism for communicating with other devices coupled to the computer. A Read-Only Memory (ROM) 206 and a Random Access Memory (RAM) 208 provide a storage mechanism for various data and information used by the computer. Although ROM 206 and RAM 208 are shown coupled to bus 200, in alternate embodiments, ROM 206 and RAM 208 are coupled directly to processor 202 or coupled to a dedicated memory bus (not shown).

A video display 210 displays various information and data to the user of the computer. A disk drive 212 provides a mechanism for the long-term mass storage of information. An input device 214 and a pointing device 216 allow the user of the computer to enter information and commands to the computer system. Input device 214 may be, for example, a keyboard, keypad, handwriting recognition device, or voice recognition device. Pointing device 216 includes, for example, a mouse, track ball, or touch pad. A printer 218 is capable of creating a hard copy of information generated by or used by the computer.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

We claim:

1. A method comprising:
    collecting performance management data having accompanying meta data, the meta data including information defining the performance management data and information indicating operations to be performed on the performance management data; and
    generating output data for display using the collected performance management data according to the information indicating the operations to be performed on the performance management data.

2. The method defined in claim 1 further comprising:
    a performance management system receiving at least one script-based program; and running the script-based program via the performance management system to periodically collect the performance management data from components in a network.

3. The method defined in claim 2 further comprising:

integrating the at least one script-based program into the performance management system as a service monitor; and using the service monitor to periodically collect the performance data.

4. The method defined in claim 3 further comprising the performance management system analyzing and integrating the performance management data.

5. The method defined in claim 3 further comprising the performance management system generating an alarm when the performance management data meets certain criteria.

6. A method for providing an interface between a user and a performance management system, the performance management system being connected with a network, the network including a plurality of components coupled by a plurality of connections, the performance management system collecting data of the components, the method comprising:

receiving at least one script-based program from the user, the script-based programs defining data types not provided by the performance management system;

integrating the program to the performance management system as a service monitor, the performance management system using the service monitor to periodically collect data of the defined data types from the components.

7. The method defined in claim 6 wherein the data collected by the service monitor is business-oriented performance management data of the components.

8. The method defined in claim 6, further comprising:

receiving input from the user, the input specifying a rate at which the service monitor polls the components;

receiving input from the user, the input specifying names, types and units of input parameters and output variables of the script-based program;

using the input from the user to setup the program as a service monitor of the performance management system.

9. The method defined in claim 6 wherein the performance management system analyzes the data collected using the service monitor.

10. The method defined in claim 9, wherein the performance management system displays at least one graph of the data collected using the service monitor.

11. The method defined in claim 9 wherein the performance management system generates at least one report of the data collected using the service monitor, and/or other types of data collected by the performance management system.

12. The method defined in claim 9, wherein the performance management system generates an alarm when the data collected using the service monitor does not meet certain criteria, the certain criteria being provided to the performance management system by the user.

* * * * *